United States Patent Office 3,403,617
Patented Oct. 1, 1968

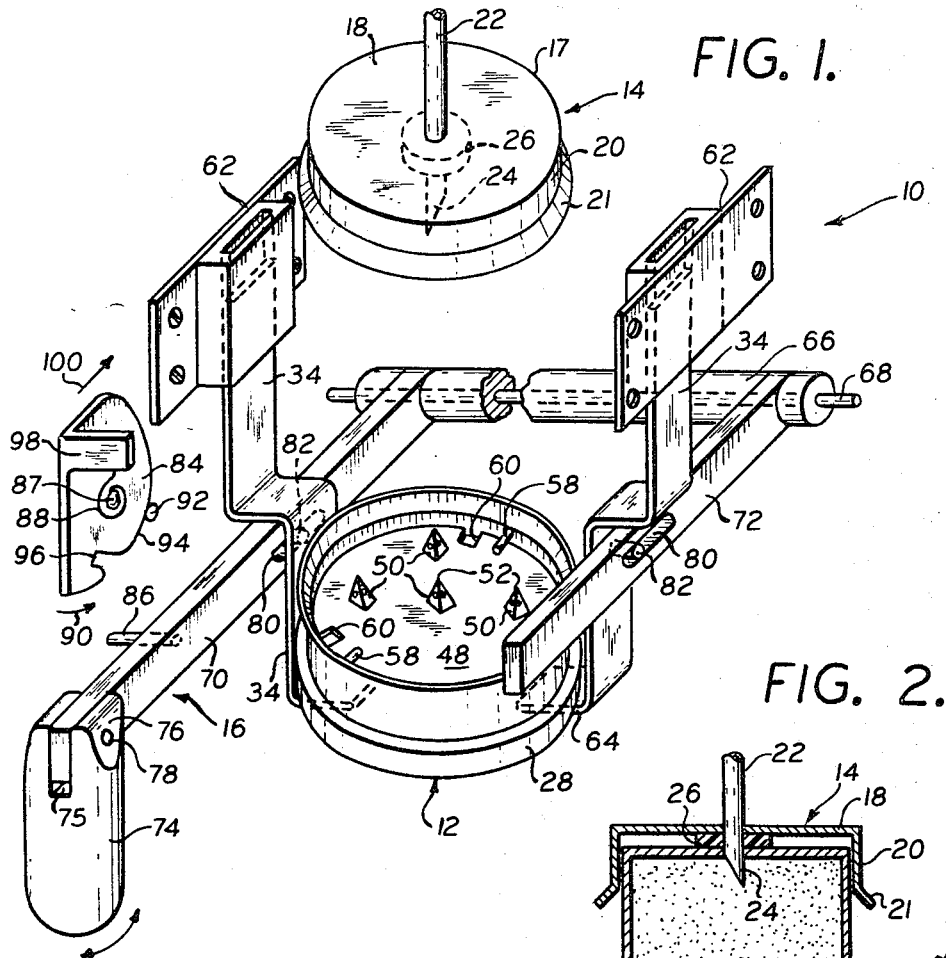
FIG. 1.
FIG. 2.
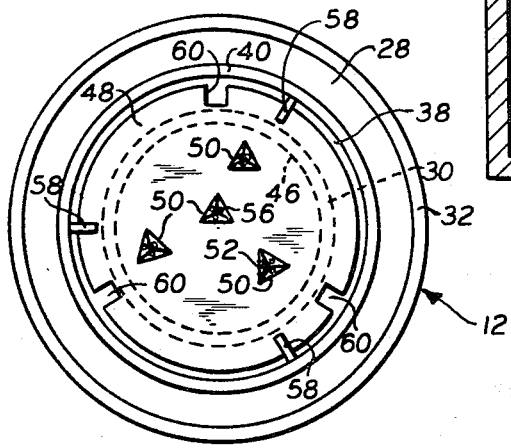
FIG. 3.
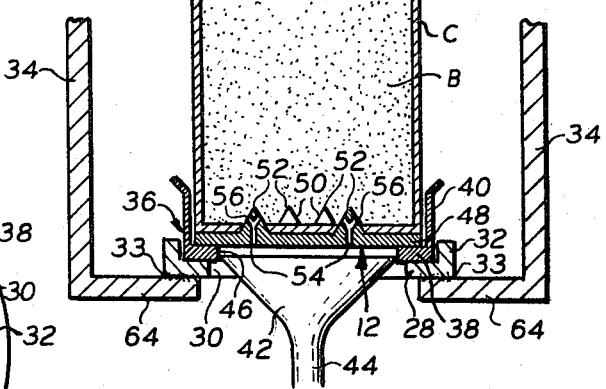
INVENTOR
WILLY G. LAMPE
BY
ATTORNEY

3,403,617
APPARATUS FOR PIERCING CONTAINERS FOR USE IN BEVERAGE PRODUCING MACHINES
Willy G. Lampe, Richmond Hill, N.Y., assignor to Universal Oil Products Company, Des Plaines, Ill., a corporation of Delaware
Continuation of application Ser. No. 522,142, Jan. 21, 1966. This application Nov. 20, 1967, Ser. No. 689,220
9 Claims. (Cl. 99—295)

ABSTRACT OF THE DISCLOSURE

An apparatus for piercing and introducing a fluid into a container having a beverage producing ingredient therein, wherein the apparatus has top and bottom structures for engagement with the container to position the same for piercing such that a fluid may subsequently be introduced into the container through the piercing structures, and means to operate the top and bottom piercing structures.

---

This invention relates generally to apparatus for piercing and introducing a fluid into a container for infusion with a pre-selected beverage producing ingredient therein and is a continuation of United States patent application Ser. No. 522,142, filed Jan. 21, 1966, and now abandoned.

More particularly, this invention is well suited for use in automatic beverage producing machines of the type primarily employed in aircraft galley equipment wherein the beverage is extracted from a beverage producing ingredient while the ingredient is still contained within the container in which it was originally packaged. It is of primary importance that such equipment be as compact as possible and require a minimum operating area so as not to distract a stewardess or hamper her in the performance of more important duties. Thus, while the present invention is peculiarly adapted for use in such machines, it will, nevertheless, be obvious that it is also applicable to beverage producing machines in general.

Accordingly, the desideratum of the present invention is to provide an apparatus for quickly and efficiently piercing a container having a beverage producing ingredient therein to prepare the container for use in a beverage producing machine.

Another object of the present invention is to provide an apparatus of the type described which simultaneously with the piercing operation, clamps the container in operative position in the machine.

Further objects and features of the present invention reside in the novel details of construction which provide for the entrance and exit of a fluid from a container having a beverage producing ingredient therein through elements which are adapted to pierce the container.

Another object of the present invention is to provide an apparatus for piercing a container having a beverage producing ingredient therein for utilization in beverage producing machines which occupies a minimum amount of space, and which requires a smaller operating area than apparatus used heretofore.

In apparatuses of the type described, it is imperative that the equipment be cleaned periodically thereby maintaining proper health procedures to prevent contamination of the apparatus by bacteria. Accordingly, a further object of the invention is to provide can piercing equipment that is easily disassembled for cleaning purposes.

Other and further objects of this invention reside in the structures and arrangements hereinafter more fully described with reference to the accompanying drawings in which:

FIG. 1 is a perspective view of an apparatus constructed according to the present invention, illustrating the apparatus in the unlatched position for receiving a container therein;

FIG. 2 is a vertical sectional view of the apparatus shown in FIG. 1, showing the apparatus in the latched position with a container packed with a beverage producing ingredient received therein; and FIG. 3 is a top plan view of the bottom piercing assembly shown in FIG. 1.

The apparatus of the present invention is designated generally by the numeral 10 in FIGS. 1 and 2 and includes a bottom piercing assembly 12, a top piercing assembly 14 and an actuating assembly 16. More particularly, the top piercing assembly 14 includes an inverted cup-like member 17 having an upper circular wall 18 and a depending peripheral flange 20 that is flared outwardly at its lower end 21 to form an entranceway for a container to be cupped therein. A hollow tube 22 extends axially downward through the wall 18 and terminates above and within the confines of the bottom edge of the flange 20 in a pointed end 24 to provide a top piercing element. A resilient washer 26 surrounds the tube 22 and abuts the undersurface of the wall 18 to provide a fluid tight fitting. The top piercing assembly 14 is adapted to be fixedly connected to a beverage producing machine of the kind disclosed in United States Letters Patent No. 3,016,930 to Dziedziula et al., and the top of tube 22 is connected to a source of liquid in the machine by appropriate means, not shown, and forming no part of this invention.

Although the top piercing assembly 14 is adapted to be fixedly connected to a beverage producing machine and, therefore, is essentially stationary, the purpose of the invention is to cause a relative movement between the piercing assemblies 12 and 14 such that the container is clamped therebetween and pierced during such movement. In accomplishing this purpose, because the piercing assembly 14 is stationary, the piercing assembly 12 is made movable in response to the operation of the actuating assembly 16.

The bottom piercing assembly 12 includes an annular ring 28 having a central through bore 20 and an upstanding peripheral flange 32. The ring 28 is connected at 33 to a pair of opposed brackets 34, as by welding, which form a portion of the actuating assembly 16. Received on the ring 28 is a cup-like member 36 having a bottom circular wall 38 that abuts and is supported by the ring 28, and an upward directed peripheral flange 40 that is flared outwardly at its upper end 41 to form an opening for a container to be received therein. Depending from, and integral with the wall 38 is a hollow funnel 42 that curves inwardly and downwardly and terminates in a narrow-neck portion 44 at the lower end thereof, and which communicates with a central through opening 46 in the wall 38 at the other end. As shown in FIG. 2, the funnel 42 is slidably received through the bore 30 in the ring 28. Additionally, the member 36 seats within the flange 32 so that the member 36 and the ring 28 may easily be separated.

Removably received within the cup-like member 36 is a circular plate 48 having a plurality of spaced upstanding bottom piercing elements 50 thereon. Each of the piercing elements 50 comprises a three-sided pyramid that terminates in an upper piercing point 52 which is spaced below the upper edge and within the confines of the flange 40. The edges formed by the adjacent sides or facets of the pyramids are sharp to provide cutting edges. A central bore 54 extends through each element 50 and the plate 48, and communicates with passages 56 which are received in the respective sides or facets of each pyramidal element. The elements 50 are positioned on the plate 48 so that the respective bores 54 communicate with the opening 46 in the member 36.

A plurality of circumferentially spaced pins 58 (FIG. 3) project radially inward from the flange 40 and they are spaced above the wall 38 by a distance slightly in excess of the thickness of the plate 48. The pins 58 are adapted to overlie the edges of the plate 48 thereby to maintain the plate in the member 36. The plate 48 is provided with a corresponding number of circumferentially spaced slots 60 which are adapted to be aligned with the respective pins 58 and which allow the pins 58 to pass therethrough. Thus, when the plate 48 is dropped into or placed within the member 36, the slots 60 are aligned with the respective pins 58 and the plate 48 rests in engagement with the wall 38. The plate 48 is then rotated so the respective slots 60 and the pins 58 are out of alignment (FIG. 3) thereby locking the plate 48 in place. The above procedure may be reversed when it is desired to separate the plate 48 and the member 36.

In practice, the top piercing and bottom piercing assemblies 14 and 12 are coaxial. The actuating assembly 16 is illustrated in detail in FIG. 1 and includes the opposed brackets 34 which are slidably received in respective channels 62 which are connected to the beverage producing machine so that the brackets 34 may be guided for vertical movement. The brackets 34 include inturned legs 64 that extend toward each other for a preselected length so that the distance between them is less than the diameter of the ring 28. The ring 28 is seated on and connected to the legs 64 and, therefore, will move with the brackets 34.

The assembly 16 further includes a hollow tube 66 that rotatably receives a coaxial shaft 68 therethrough. The ends of the shaft 68 are fixedly connected to the beverage producing machine by appropriate means, not shown, so that the tube 66 is rotatable with respect to the machine. Opposed arms 70 and 72 extend laterally forwardly from the tube 66; the arm 70 is longer than the arm 72 and a handle 74 depends from the end thereof. More particularly, the handle 74 is provided with a bifurcated end 76 that receives the arm 70 in the forked slot 75 defined thereby. A pivot pin 78 connects the handle 74 to the arm 70 for pivotal movement with respect thereto. Accordingly, when the handle 74 is pulled forward and upward, the forward edge of the arm 70 will engage the bottom surface of the slot 75 and cause the arm 70 and, therefore, the arm 72 to swing upward in an arc about the axis of the tube 66. The arms 70 and 72 are provided with aligned elongated slots 80 intermediate their ends. Each of the slots 80 slidingly receives a pin 82 that projects rearwardly from each bracket 34 to provide a lost motion connection therebetween. The connections comprising the slots 80 and the respective pins 82 translate the arcuate or rotational motion of the arms 70 and 72 into corresponding vertical movement of the brackets 34.

A latch plate 84 is adapted to cooperate with a laterally projecting pin 86 carried by the arm 70 to latch the actuating assembly 16 in an operative position. More particularly, the latch plate 84 is pivotally mounted on the beverage producing machine by a pivot pin 87. A torsion spring 88 engages the plate 84 and biases the lower portion of the plate about the pin 87 and in the direction indicated by an arrow 90. A stop pin 92 is adapted to engage an arcuate cam surface 94 on the face of the plate 84 to limit the movement of the plate in the aforenoted direction. Provided in the plate 84 is a slot 96 which extends to a cam surface 94. Accordingly, as the arms 70 and 72 are moved upwardly, the pin 86 engages and rides on the cam surface 94 thereby rotating the latch plate 84 in a direction opposite to the direction indicated by the arrow 90. However, when the pin 86 is aligned with the slot 96, the torsion spring 88 will bias the plate 84 back to its original position thereby capturing the pin in the slot and latching the mechanism 16 in an operative position, as described more fully below.

A laterally projecting ear 98 is provided on the plate 84 adjacent to the top edge thereof. The ear 98 is adapted to be moved manually in the direction indicated by an arrow 100 to rotate the plate 84 about the pivot pin 87 and in a direction to release the pin 86 thereby to unlatch the actuating assembly 16.

In operation, the actuating assembly 16 is moved to its lowermost position and the member 36 having the plate 48 therein is placed on the ring 28. A sealed container C of conventional metal construction and having a beverage producing ingredient B therein is placed in the cup-like member 36 with the bottom surface 90 of the container C resting on the points 52 of the elements 50. Since the points 52 are spaced from the top edge of the flange 40, the flange 40 will surround the bottom portion of the container and maintain the container C in an upright position. The flared portion 41 of the member 36 facilitates the insertion of the container C therein. The handle 74 is then moved upward thereby causing the brackets 34 to move vertically upward. Thus, the bottom piercing assembly 12 will move toward the top piercing assembly 14 until the upper portion of the container C is received within the area defined by the flange 20 and the upper surface 92 of the container abuts the pointed edge 24 of the tube 22. The flared end of the flange 20 facilitates the reception of the container C into the aforementioned area.

The continued upward movement of the handle 74 causes a force to be exerted on the upper and lower container surfaces 90, 92 at the respective point contacts 24 and 52 of the piercing elements. This force increases in proportion to the upward force on the handle 74 and the arm 70 until the piercing elements 50 and the pointed edge 24 of the tube 22 pierce the lower and upper surfaces of the container C. The upward movement of the handle 74 is continued until the latch plate 84 engages the pin 86 to latch the assembly 16 in the upper position. The elements comprising the apparatus 10 are sized so that when the assembly 16 is latched, the container C will be clamped between the bottom and top piercing assemblies 12 and 14 and the top surface 92 of the container C will compress the washer 26 to provide a seal about the puncture produced by the tube 22.

To produce the beverage, the fluid (not shown) is selectively allowed to flow through the tube 22 and leach through the beverage producing ingredient B in the container C. The beverage flows through the passages 56 in each of the elements 50 and through the respective bores 54 into the funnel 42. As a result, the beverage will pour out of the narrow-neck portion 44, which serves as a pouring spout, and into a flask or cup positioned thereunderneath.

When it is desired to remove the container C, the assembly 16 is unlatched in the aforenoted manner and moved to its lower position. The container C is thereby separated from the top piercing assembly 14 and carried to the lower position by the member 36. The container C may then be removed from the bottom piercing assembly 12 and discarded and a new container placed into the apparatus 10. It is to be noted that none of the elements comprising the apparatus 10 are positioned in front of the top and bottom piercing assemblies thereby to obstruct or hamper the removal or the insertion of a container. Hence, the present apparatus greatly facilitates such operations. Additionally, since the handle 74 is substantially in a vertical plane, the overall length of the apparatus is decreased thereby providing a compact unit.

Accordingly, an apparatus has been provided for piercing and introducing a fluid into containers having preselected beverage producing ingredients therein which occupies a minimum area, and which is openly accessible to facilitate the insertion or the removal of a container therefrom. Moreover, since the ring 28, the member 36 and the plate 48 are readily separable, the cleaning of the apparatus is greatly facilitated.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. An apparatus for use in a beverage producing machine for piercing containers having a beverage producing ingredient therein comprising
   a top piercing assembly,
   a bottom piercing assembly,
   actuating means for moving one of said piercing assemblies relative to the other to clamp and pierce opposed surfaces of a container received therebetween,
   said actuating means including lever means adapted to be connected to the machine for rotational movement with respect to said top and bottom piercing assemblies,
   translating means interconnecting said lever means and one of said piercing assemblies for translating the rotational motion of said lever means into linear movement of said one of said assemblies,
   whereby the rotation of the lever means in a first direction causes said top and bottom assemblies to pierce and clamp a container received therebetween and movement of said lever means in a second direction causes said top and bottom piercing assemblies to separate for the removal of a container therefrom and for the insertion of a new container therebetween,
   said translating means including bracket means connected to said one of said piercing assemblies,
   mounting means adapted to mount said bracket means on said machine for linear movement relative to the other of said piercing assemblies,
   connecting means connecting said lever means and said bracket means for conjoint movement,
   said bottom piercing assembly including a cup-like member for receiving the container therein,
   a plurality of piercing elements in the bottom of said cup-like member terminating below the upper edge of said member for piercing the bottom surface of said container,
   a plate removably received in said cup-like member and supporting said plurality of piercing elements thereon,
   and at least a passage in preselected ones of said plurality of piercing elements for providing for the passage of a beverage therethrough.

2. An apparatus according to claim 1,
and passage means in said top and bottom piercing assemblies for providing for the passage of a fluid into the container, through the beverage producing ingredient therein, and out of said container.

3. An apparatus according to claim 1,
and latching means for latching the actuating means in a position wherein a container is pierced by the top and bottom piercing assemblies and is clamped therebetween.

4. An apparatus as in claim 1,
wherein said mounting means comprise channels slidably receiving the bracket means therein.

5. An apparatus as in claim 1,
wherein said bracket means comprises a pair of opposed brackets connected to said one of said piercing assemblies,
and said lever means comprises a pair of opposed laterally projecting arms individually connected to each bracket by said connecting means,
one of said pair of opposed arms being longer than the other of said opposed arms,
and a depending handle pivotally connected to said one of said opposed arms and adapted to engage the lower edge thereof to move said lever means in the first direction.

6. An apparatus according to claim 5,
including a tube connecting the ends of said opposed arms,
and a shaft rotatably received through said tube and adapted to be fixedly connected to the machine to rotatably mount said opposed arms on the machine.

7. An apparatus as in claim 6,
wherein said connecting means comprises an elongated slot in each of said opposed arms,
and a pin projecting from each of said brackets being slidably received in a respective elongated slot whereby the rotational movement of said lever means is translated into linear movement of said brackets.

8. An apparatus as in claim 1,
and a hollow funnel having a narrow-neck portion connected to the bottom of said cup-like member and communicating with the passages in said preselected ones of said plurality of piercing elements to provide a beverage pouring spout at the narrow-neck portion thereof.

9. An apparatus according to claim 1,
wherein said top piercing member comprises an inverted cup-like member for receiving a container therein,
a central piercing element in said inverted cup-like member terminating above the lower edge of said member and within the confines thereof,
a passage in said central piercing element for providing for the passage of a fluid therethrough, and a resilient washer received about said central piercing element and adapted to be compressed between said cup-like member and the container to provide an air-tight seal therebetween.

References Cited
UNITED STATES PATENTS

| | | | |
|---|---|---|---|
| 2,899,106 | 8/1959 | Weinert | 99—295 |
| 2,939,381 | 6/1960 | McBride | 99—289 X |
| 2,952,202 | 9/1960 | Renner et al. | 99—295 X |
| 3,260,190 | 7/1966 | Levinson | 99—295 |

ROBERT W. JENKINS, *Primary Examiner.*